United States Patent
Kershaw

(10) Patent No.: US 7,832,270 B2
(45) Date of Patent: Nov. 16, 2010

(54) APPARATUS FOR MEASURING ROTATIONAL IMBALANCE OF A TURBOCHARGER CORE ASSEMBLY

(75) Inventor: Geoffrey Kershaw, Collingtree (GB)

(73) Assignee: Turbo Technics Limited, Northampton (GB)

( * ) Notice: Subject to any disclaimer, the term of this patent is extended or adjusted under 35 U.S.C. 154(b) by 475 days.

(21) Appl. No.: 11/853,151

(22) Filed: Sep. 11, 2007

(65) Prior Publication Data

US 2008/0060434 A1 Mar. 13, 2008

(30) Foreign Application Priority Data

Sep. 12, 2006 (GB) .................. 0617900.6

(51) Int. Cl.
*G01M 1/16* (2006.01)
(52) U.S. Cl. .......................................... 73/455
(58) Field of Classification Search ............ 73/455, 73/460, 471, 472
See application file for complete search history.

(56) References Cited

U.S. PATENT DOCUMENTS

| | | | | |
|---|---|---|---|---|
| 4,543,825 A | * | 10/1985 | Schonfeld et al. | 73/459 |
| 4,864,859 A | * | 9/1989 | Jensen | 73/473 |
| 5,067,349 A | * | 11/1991 | Hirchert | 73/472 |

* cited by examiner

*Primary Examiner*—John E Chapman
(74) *Attorney, Agent, or Firm*—Boyle Fredrickson, S.C.

(57) ABSTRACT

Apparatus for measuring rotational imbalance of a turbocharger core assembly, comprising a base frame (30) having a housing (31) in the form of an exhaust duct. Attached by leaf springs (33) to the housing (31) is a support part (35) and a co-axial adaptor (36) to which a turbocharger core assembly (38) is removably attached by quick-release clamps (37). An air inlet (40) receives air to drive the turbocharger core assembly via a volute within the adaptor (36), and any imbalance of the turbocharger core assembly, causing oscillatory vibration via the leaf springs (33) is measured by an accelerometer (40) mounted on the support part (35).

9 Claims, 4 Drawing Sheets

APPARATUS FOR MEASURING ROTATIONAL IMBALANCE OF A TURBOCHARGER CORE ASSEMBLY

BACKGROUND AND SUMMARY OF THE INVENTION

THIS INVENTION concerns turbochargers and more particularly a test rig for measuring out of balance conditions of a turbocharger core assembly.

The core assembly of a turbocharger comprises three main parts, namely a turbine which in service is driven by the exhaust gas from a pump, usually an internal combustion engine, a turbine wheel drivingly connected to the turbine whose function is to force more air into the pump's air intake or air supply, and a centre hub rotating assembly which contains bearings and a shaft directly connecting the turbine and turbine wheel. This core assembly can rotate in service at speeds typically in the region of 100,000 to 200,000 revolutions per minute and so dynamic balancing of the assembly about its rotational axis is critical. Individual imbalance of the turbine, the turbine wheel and the connecting shaft can cause an accumulation of balance error which at high operating speed can result in a noisy turbocharger and, in a severe case can cause premature bearing failure.

The imbalance can be corrected by running the core assembly at high speed on a flexible suspension of a test rig, measuring the vibration response and consequently removing metal from the rotational assembly to achieve an acceptable balance.

Such a test rig provides a slave turbine housing adaptor with quick release clamps for attachment and removal of the turbine core assembly, and the adaptor is in turn attached to a flexibly mounted air nozzle assembly which directs air into the housing to rotate the turbine and shaft. An accelerometer is attached to the adaptor to measure vibration of the complete assembly. Usually, the admission of air to the turbine is controlled allowing the assembly to be accelerated slowly across the appropriate speed range. Thus, the assembly may be balanced dynamically at different speeds.

Various methods and devices have been used for mounting and driving the turbocharger core assembly in a high-speed core balancing rig.

Such devices include, for example, a rubber or other resilient mounting block which isolates the assembly from a machine frame. A major disadvantage with resilient mounting of this kind is that the mounting block has degrees of freedom in all directions and does not properly manage the resilient support for the assembly.

Another technique is to mount the assembly in a rig comprising a pair of spaced leaf springs mounted on a rigid base so that the whole assembly is capable of oscillatory vibration in a single plane transversely across the springs. However, the air inlet is usually disposed at one side of the machine with the nozzle tube assembly passing between the leaf springs to transmit the air to the core assembly mounted at an opposite side. A disadvantage with this arrangement is that the nozzle tube assembly can introduce undesirable resonance resulting in an inaccurate measurement of the true imbalance vibration of the core assembly.

It is an object of the present invention to provide an apparatus for measuring rotational imbalance of a turbocharger core assembly wherein the aforementioned disadvantages are substantially avoided.

According to the present invention, there is provided an apparatus for measuring rotational imbalance of a turbocharger core assembly, comprising a base frame, support means for mounting a rotational core assembly thereon, air supply means for rotationally driving a turbine of the core assembly, and a device to measure transverse oscillatory vibration of the core assembly during rotation; characterized in that the support means comprises a rigid annular housing mounted between spaced resilient means attached to the base frame such as to afford a degree of movement of the rigid annular housing in a plane transverse to the rotational axis of the core assembly; and in that the rigid annular housing includes a volute through which air is fed to drive the core assembly.

Preferably, the spaced resilient means comprises a pair of leaf springs attached respectively at two opposed locations to the base frame such that they are located one on each side of the rotational axis of the core assembly.

The support means may be attached to and between the leaf springs.

The rigid annular housing of the support means may comprise two co-axial parts, the first part being attached by the resilient means to the base frame and having a driving air inlet passage communicating with an internal annular chamber; the second part being an adaptor removably attached to the first part and containing said volute which when the two parts are attached together extends into the annular chamber of the first part to receive driving air from said air inlet.

The air inlet in the first part may be bi-directional thus to enable air to be directed around said volute in which ever rotational direction is determined by the configuration of the volute, thus to enable selective directional rotation of a core assembly.

The volute may be configured to occlude one passage of the bi-directional air inlet of the first part while revealing the other for receiving driving air therefrom.

The volute may be configured to deliver driving air preferentially to a reduced diameter portion of the turbine of a core assembly.

The device to measure the transverse vibration of the core assembly may be an accelerometer mounted on the first part of the support means.

The base frame may comprise an annular air exhaust housing co-axially and sealingly engaged with the support means while allowing said degree of relative movement thereof.

Clamping means may be provided on the support means for ready attachment and removal of the turbocharger core assembly.

BRIEF DESCRIPTION OF THE DRAWINGS

An embodiment of the invention will now be described, by way of example only, with reference to the accompanying drawings, in which.

DETAILED DESCRIPTION OF THE INVENTION

Figure 1:
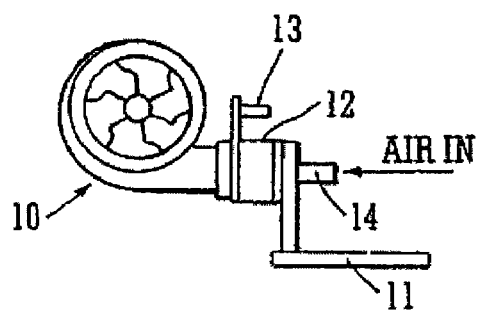
FIG. 1 schematically illustrates one conventional form of apparatus for measuring the rotational imbalance of the turbocharger core assembly.

Referring to FIG. 1, in one conventional arrangement, a combined turbine housing and volute 10 is mounted on a rigid and fixed base frame 11 by way of a rubber suspension block 12. An accelerometer 13 is provided to measure oscillatory vibration from the turbine housing to which air is supplied via inlet 14 to drive the turbine.

As mentioned previously, the disadvantage of this method of mounting is that the rubber block 12 is free to oscillate in many directions and thus does not provide a very positive location for the turbine housing 10.

Figure 2:
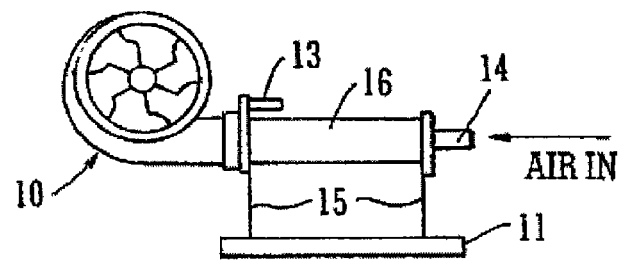
FIG. 2 shows a further conventional form of apparatus for this purpose.

Referring now to FIG. 2, in an alternative conventional arrangement, the turbine housing 10 is mounted on one of a pair of spaced leaf springs 15 extending from the fixed base 11. Thus, the turbine housing is afforded a degree of oscillatory movement transversely across the leaf springs. However, in this case a nozzle tube assembly 16 connects the air inlet 14, across the leaf springs, to the turbine housing 10, and the assembly 16 can vibrate separately and thus introduce undesirable resonances which can result in an inaccurate reading of the vibration of the turbine housing.

Figure 3:
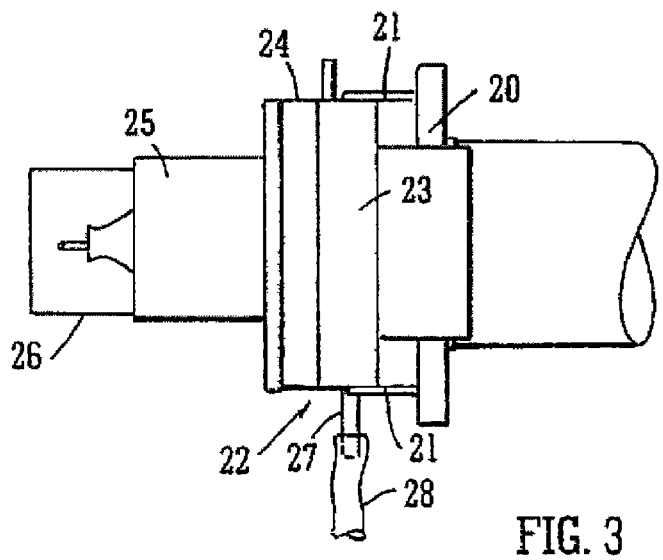
FIG. 3 is a schematic illustration of a form of such apparatus made in accordance with the invention.

Referring now to FIG. 3, and in accordance with the invention, there is provided a base frame 20 adapted to be mounted rigidly to the floor of a test room, with a pair of leaf springs 21 extending forwardly of the frame 20 thus to provide a mounting for a support housing 22 consisting of a first part 23, and an adaptor 24 to which is attached a turbocharger core assembly housing 25. A shroud 26 is provided to cover the otherwise exposed turbine wheel of the turbocharger core assembly. This is for safety and also to avoid excess windage.

An air inlet 27 is fed via a flexible pipe 28 to deliver air to the support housing 22 wherein a volute within adaptor 24 feeds the air peripherally to the turbine of the turbocharger core assembly to drive it in rotation.

It will be seen that the rotational axis of the turbocharger core assembly and of the volute within the adaptor 24 passes through the space between the supporting leaf springs 21. In this case, the disadvantage of the conventional arrangement illustrated in FIG. 2, is avoided since there is no nozzle tube assembly 16, and because the turbocharger core assembly and volute are mounted within the confines of the leaf spring assembly and are co-axial with the support means.

Figure 4:
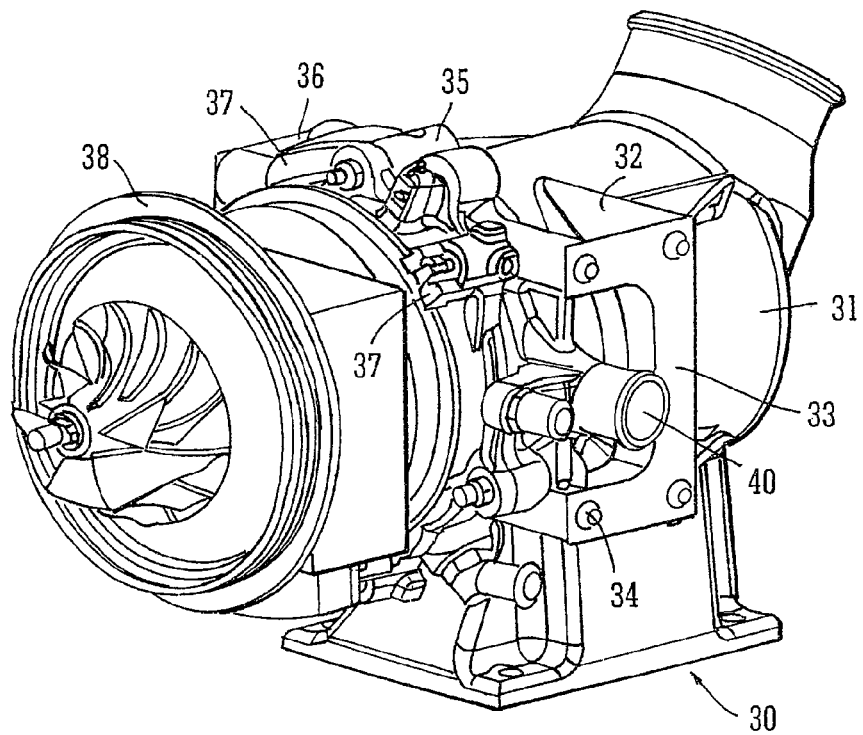
FIG. 4 is a perspective view of the apparatus schematically illustrated in FIG. 3.

Referring now to FIG. 4, and in further detail, the apparatus comprises a fixed base frame 30 on which is mounted an annular housing 31 having an exhaust air duct 39. Bolted to outriggers 32 on opposed sides of the housing 31 is a pair of leaf springs 33 having free ends 34 which serve to support a first part 35 of the support means generally indicated at 22 in FIG. 3. Bolted to the front of the first part 35 is the second part of the support means in the form of an adaptor 36. This is equivalent to the part 34 in FIG. 3.

Quick release clamps 37 enable ready attachment and removal of a turbocharger core assembly 38 equivalent to the assembly 25 in FIG. 3.

Figure 5:
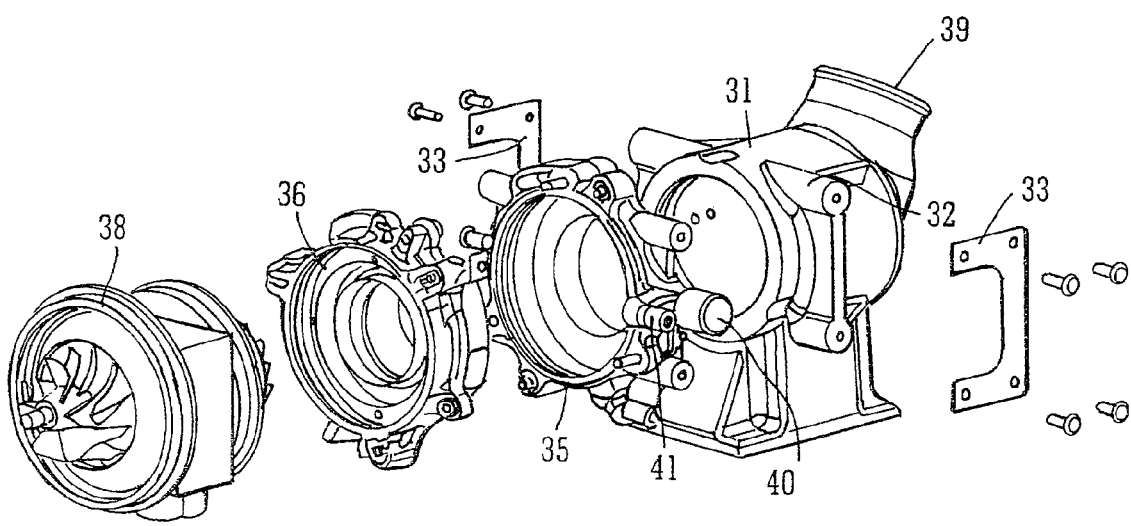
FIG. 5 is an exploded view of the parts of the apparatus illustrated in FIG. 4.

Referring to FIG. 5 it will be seen that the apparatus is in three parts comprising the housing 31, the first part 35 and the adaptor 36. The adaptor 36 is interchangeable for a purpose to be described whereas the first part 35 may be permanently attached to the housing 31 by way of the leaf springs 33.

In FIGS. 4 and 5, the air inlet is illustrated at 40 and is in the form of a spigot to which the flexible pipe 28 can be attached, and an accelerometer is illustrated at 41 bolted to the part 35 adjacent the air inlet 40.

Figure 6:
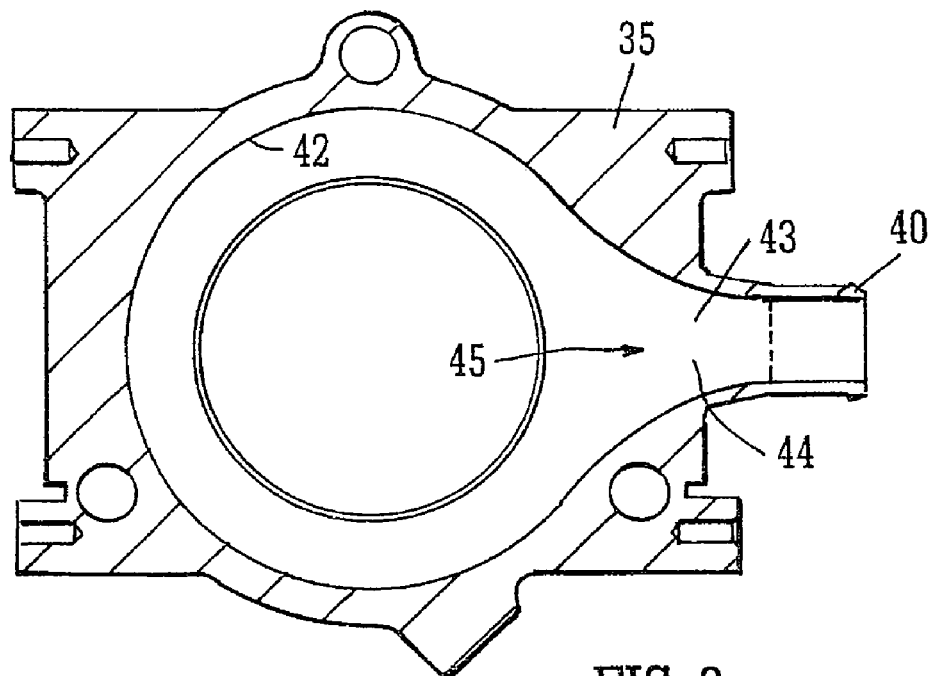
FIG. 6 is a first cross-sectional elevation viewed in an axial direction of a part of the apparatus of FIG. 4.

Referring now to FIG. 6, there can be seen, within the first part 35, an internal chamber 42 which communicates with the air inlet 40 by way of bi-directional passages 43 and 44 defined by a central abutment 45.

Figure 7:
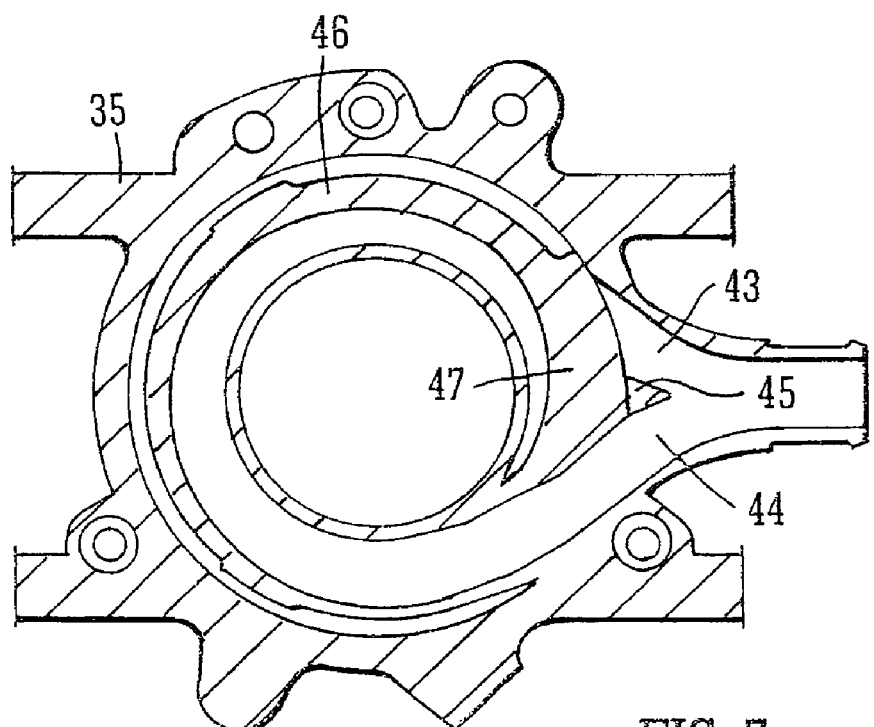
FIG. 7 is a similar cross-sectional elevation of another part of the apparatus illustrated in FIG. 4.

Referring now to FIG. 7, there can be seen a volute 46 which is located fixedly within the adaptor 36 in such a way that in the assembled apparatus the volute occupies the chamber 42 of the part 35. In the example illustrated in FIG. 7, the passage 43 is occluded by a part 47 of the volute while the passage 44 is revealed to admit the air from the inlet 40 into and around the spiral passage of the volute 46.

Figure 8:
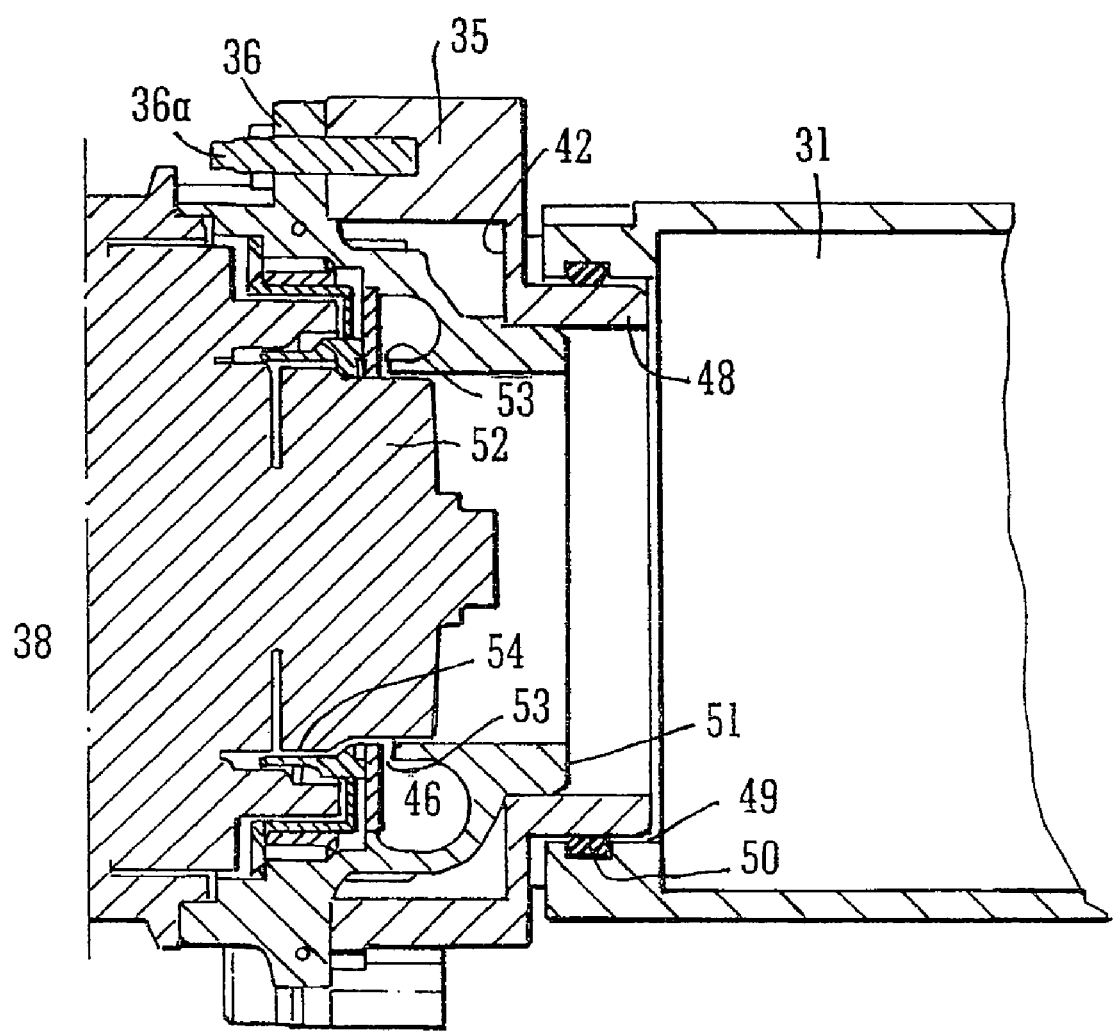
FIG. 8 is a further cross-sectional elevation of the apparatus illustrated in FIG. 4.

Referring now to FIG. 8, in the assembled apparatus with a turbocharger core assembly 38 attached thereto, the first part 35 of the support means, mounted on the leaf springs 33, has an outlet collar 48 which is co-axial with the internal chamber 42 and sits within an inlet reveal 49 of the housing 31 with a resilient sealing ring 50 therebetween. Thus, the part 35 forms a loose fit within the housing 31 to the extent that a limited degree of oscillatory movement is provided by the resilient sealing ring 50 in a direction across the rotational axis of the apparatus by virtue of the leaf springs 33. It cannot move axially relative to the housing 31 or to any of the remainder of the apparatus but can move only in a direction transverse to the rotational axis.

The adaptor 36 is bolted as at 36a to the part 35 with a portion 51 of the volute 46 received within the collar 48 of the first part 35.

The turbocharger core assembly clamped to the adaptor 36 thus has its turbine wheel 52 located concentrically within the volute 46 such that air in the passage of the volute is supplied to the blades of the turbine wheel 52 to cause rotation of the entire core assembly.

It will be seen that the air is introduced, via narrow slots 53 to the reduced diameter exducer portion of the turbine 52, as opposed to the larger diameter portion 54 to which the driving air would normally be supplied from the volute in a turbocharger in service where hot engine exhaust gases are used to drive the turbine. In the test rig forming the apparatus of the present invention, air at ambient temperature is used to drive the turbine and so to supply the air through the narrow slots 53 to the reduced diameter part of the turbine is more efficient in producing the rotational speeds necessary to test the balance of the core assembly.

In use therefore, air is supplied to the air inlet 40 at a velocity sufficient to drive the turbine up to the required rotational speed while the accelerometer 41 measures any oscillatory vibration thus to provide information as to any imbalance of the rotary core assembly. Normal rebalancing techniques can then be applied and the test can be repeated.

The adaptor 36 can be readily replaced by an adaptor having a volute of opposite hand thus to enable the turbocharger core to be driven in the opposite direction since, in some cases, dynamic balancing in two directions may be required. As described in relation to FIG. 7, when an opposite-hand volute is introduced into the chamber 42, the bi-directional air inlet causes passage 43 to be revealed and passage 44 to be occluded. Thus a two-directional test may be carried out in the shortest possible time.

Apparatus for measuring the rotational imbalance of the turbocharger core assembly, made in accordance with the invention, avoids the generation of resonating components, enables positive positioning of the core assembly for loading and correction operations, provides a quick change over between different turbocharger core models and accepts a variety of sizes of turbocharger housing owing to its axial mounting above the floor on which the base frame 30 is mounted.

I claim:

1. Apparatus for measuring rotational imbalance of a turbocharger core assembly, comprising a base frame, support means for mounting a rotational core assembly thereon, air supply means for rotationally driving a turbine of the core assembly, and a device to measure transverse oscillatory vibration of the core assembly during rotation; characterised in that the support means comprises a rigid annular housing mounted between spaced resilient means attached to the base frame such as to afford a degree of movement of the rigid annular housing in a plane transverse to the rotational axis of the core assembly; and in that the rigid annular housing includes a volute through which air is fed to drive the core assembly, wherein the rigid annular housing of the support means comprises two axial parts, the first part being attached by the resilient means to the base frame and having a driving air inlet passage communicating with an internal annular chamber; the second part being an adaptor removably attached to the first part and containing said volute which when the two parts are attached together extends into the annular chamber of the first part to receive driving air from said air inlet.

2. Apparatus according to claim 1, wherein the spaced resilient means comprises a pair of leaf springs attached respectively at two opposed locations to the base frame such that they are located one on each side of the rotational axis of the core assembly.

3. Apparatus according to claim 2, wherein the support means is attached to and between the leaf springs.

4. Apparatus according to claim 1, wherein the air inlet in the first part is bi-directional thus to enable air to be directed around said volute in whichever rotational direction is determined by the configuration of the volute thus to enable selective directional rotation of a core assembly.

5. Apparatus according to claim 4, wherein the volute is configured to occlude one passage of the bi-directional air inlet of the first part while revealing the other for receiving driving air therefrom.

6. Apparatus according to claim 1, wherein the volute is configured to deliver driving air preferentially to a reduced diameter portion of the turbine of a core assembly.

7. Apparatus according to claim 1, wherein the device to measure transverse vibration of the core assembly is an accelerometer mounted on the support means.

8. Apparatus according to claim 1, wherein the base frame comprises an annular air exhaust housing co-axially and sealingly engaged with the support means while allowing said degree of relative movement thereof.

9. Apparatus according to claim 1, including clamping means on the support means for ready attachment and removal of a turbocharger core assembly.

* * * * *